US011344945B2

(12) United States Patent
Skolaude

(10) Patent No.: US 11,344,945 B2
(45) Date of Patent: May 31, 2022

(54) DEVICE AND METHOD FOR SETTING A CONNECTION ELEMENT ON A WORKPIECE

(71) Applicant: RICHARD BERGNER VERBINDUNGSTECHNIK GMBH & CO. KG, Schwabach (DE)

(72) Inventor: Andreas Skolaude, Schwabach (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 0 days.

(21) Appl. No.: 16/819,424

(22) Filed: Mar. 16, 2020

(65) Prior Publication Data

US 2020/0215600 A1 Jul. 9, 2020

Related U.S. Application Data

(63) Continuation of application No. PCT/EP2018/074839, filed on Sep. 14, 2018.

(30) Foreign Application Priority Data

Sep. 14, 2017 (DE) ...................... 10 2017 216 348.8

(51) Int. Cl.
*B21J 15/28* (2006.01)
*B21J 15/02* (2006.01)
*B23P 19/06* (2006.01)

(52) U.S. Cl.
CPC ............... *B21J 15/28* (2013.01); *B21J 15/02* (2013.01); *B23P 19/064* (2013.01)

(58) Field of Classification Search
CPC ... B21J 15/28; B21J 15/02; B21J 15/10; B21J 15/38; B21J 15/30; B23P 19/064
See application file for complete search history.

(56) References Cited

U.S. PATENT DOCUMENTS

| 4,893,976 A | 1/1990 | Milliser et al. |
| 5,722,139 A * | 3/1998 | Ladouceur ............ F16B 37/068 29/512 |
| 10,322,477 B2 | 6/2019 | Skolaude |

(Continued)

FOREIGN PATENT DOCUMENTS

| DE | 750 791 | 5/1943 | |
| DE | 750791 C * | 9/1953 | .............. B21J 15/14 |

(Continued)

OTHER PUBLICATIONS

Nlepmann, DE-750791-C Machine Translation (Year: 1953).*
Skolaude, DE-10 2004 052 009-B3 Machine Translation (Year: 2005).*

*Primary Examiner* — Lee A Holly
(74) *Attorney, Agent, or Firm* — Muncy, Geissler, Olds & Lowe, P.C.

(57) ABSTRACT

A device and the method serve to set a connecting element, in particular a press-in bolt, on a workpiece. By means of a setting unit, a hole punching operation for introducing a hole and, at the same time, a hole-forming operation are carried out, in which an edge of the hole is deep-drawn using an embossing sleeve and a collar is formed. In a second stage, the connecting element is pressed in, the punching and hole-forming operation and the pressing taking place within the same axial axis without the workpiece being laterally displaced relative to the device.

14 Claims, 5 Drawing Sheets

(56) References Cited

U.S. PATENT DOCUMENTS

| | | | | |
|---|---|---|---|---|
| 10,695,823 B2 * | 6/2020 | Skolaude | ................ | H02K 7/06 |
| 10,799,938 B2 * | 10/2020 | Skolaude | ................ | B21J 15/30 |
| 2017/0259326 A1 * | 9/2017 | Skolaude | ................ | B21J 15/26 |
| 2018/0021844 A1 | 1/2018 | Skolaude | | |
| 2019/0070657 A1 | 3/2019 | Skolaude | | |

FOREIGN PATENT DOCUMENTS

| | | | | |
|---|---|---|---|---|
| DE | 37 04 763 C1 | 10/1988 | | |
| DE | 102004052009 B3 * | 12/2005 | ............ | B21D 28/20 |
| WO | WO 2016/055478 A1 | 4/2016 | | |
| WO | WO 2016/156359 A2 | 10/2016 | | |
| WO | WO 2017/102668 A1 | 6/2017 | | |

* cited by examiner

DEVICE AND METHOD FOR SETTING A CONNECTION ELEMENT ON A WORKPIECE

This nonprovisional application is a continuation of International Application No. PCT/EP2018/074839, which was filed on Sep. 14, 2018, and which claims priority to German Patent Application No. DE 10 2017 216 348.8, which was filed in Germany on Sep. 14, 2017, and which are both herein incorporated by reference.

BACKGROUND OF THE INVENTION

Field of the Invention

The present invention relates to a device and a method for carrying out a setting process for setting connecting elements on a workpiece.

Description of the Background Art

The connecting elements are, for example, press-in elements such as press-in nuts, press-in bolts (EPB), press-in screws or rivets, which are pressed into a workpiece (component), usually a sheet metal, by exerting a predetermined press-in force. The present application relates in particular to the pressing in of press-in bolts, such as, for example press-in screws. The connecting elements can also be other screws or rivets or bolts. In automated processes or also in partially automated processes, the connecting elements are fastened to the workpiece using a so-called setting unit. This is usually designed as a press-in unit which has a hydraulically/pneumatically/electrically movable plunger which exerts a press-in force in the setting direction on the connecting element. WO2016/156359 A2, which corresponds to US 2018/0021844, and which is incorporated herein by reference, shows an electrical direct drive for a setting unit.

The connecting elements are usually fed to a setting head of the setting unit with the aid of a supply unit. A supply unit referred to as a supply block can be found in WO 2016/055478 A1, which corresponds to U.S. Pat. No. 10,322,477, which is incorporated herein by reference. A further supply unit can be found in WO 2017/102668, which corresponds to US 2019/0070657, which is incorporated herein by reference.

If the press-in elements are not self-punching elements, a hole must be punched into the workpiece before the setting operation, into which the press-in element is inserted. This requires an additional operation. In the hole punching process, a so-called punching slug is produced, which must be disposed of.

In many areas of application, the highest possible cycle rate for attaching the connecting elements to the workpiece is important. This applies in particular to the automotive industry.

For automated setting, processing machines, in particular industrial robots in particular, are used in which the setting unit is arranged on a robot hand that can be moved freely in space. In the case of motor vehicles in particular, the connecting elements are often arranged on complex body components, the fastening points being difficult to access for the setting unit due to the complex component geometry.

When inserting press-in bolts, the component is often specially prepared for pressing in the press-in bolt in order to ensure reliable fixation of the press-in bolt. For this purpose, a so-called spout and a punched hole are often made in the sheet in a first step. The spout is a deep-drawn collar surrounding the hole. The collar is formed by reshaping the hole edge, i.e. the collar is drawn up towards a head of the press-in bolt. The component thus prepared is used in conventional systems for example. inserted by means of a robot gripper in a C-bracket for pressing in the bolt. The existing punched hole serves as centering on a centering mandrel of a tool holder arranged on the die side, i.e. the hole in the workpiece is threaded onto the centering mandrel with the help of the robot gripper.

The disadvantages of conventional systems are as follows: an additional step is required to insert the deep-drawn collar and the punched hole; and by deviating the actual position of the centering pin and the hole or tool position (determined by robot) when "threading" there is tension between the components. This position deviation depends on the exact programming of a robot path of the robot. If the deviation is too large, the component cannot be "threaded" onto the centering mandrel, or only with difficulty, which can lead to faults.

SUMMARY OF THE INVENTION

It is therefore an object of the invention to enable simple and reliable setting of connecting elements, in particular press-in bolts.

In an exemplary embodiment, the device generally comprises a tool carrier, which is in particular designed as a C-arm and which has a setting unit on its upper C-arm. The setting unit can be moved in an feed direction with the aid of a feed unit. The feed unit is also arranged on the tool carrier together with a preferably electric drive. With the help of the drive, a plunger is fed in a feed direction. The plunger is typically guided within a plunger tube and acts on a punch sleeve and a punch of the setting unit. The setting unit is attached to the feed unit, preferably attached to the plunger tube. The setting unit therefore forms a functional unit with the feed unit.

Opposite the setting unit, a component carrier is arranged on the die side, on which the workpiece/component, especially sheet metal, is placed. The device is designed for a two-stage setting process, with a hole punching operation being supplemented by a hole-forming operation in a first stage and the actual setting process in a second stage. The hole-forming process is understood to mean the formation of the deep-drawn collar, that is to say the shaping or bending up of the hole edge of the punched hole. A particular advantage here is that the two stages are carried out on the same axis, i.e. the workpiece and the device, especially the setting unit, remain in the same lateral relative position. The same setting unit and the same component carrier are used for the two stages/operations. A tool change is not intended or required. Both the hole punching/hole forming operation and the actual setting operation are carried out using the same setting unit and within the same axis.

The individual steps in the setting process are initiated with the aid of a control device which controls the individual drives described below in a suitable manner and in a coordinated manner.

To form the deep-drawn collar in the workpiece, the component carrier has an embossing sleeve which is displaceable against the feed direction and which can be moved against the workpiece from below during operation, so that the desired collar (spout) is formed.

To carry out the punching operation, the setting unit comprises a (stamping) punch which can be moved in the feed direction.

The embossing sleeve preferably has a free inner channel into which the stamping punch penetrates during the punching operation.

The embossing sleeve therefore has, an inner edge which acts as a stamping edge when the stamping punch moves into the embossing sleeve from above. The diameter of the punch is adapted to the diameter (free inside diameter) of the embossing sleeve. The embossing sleeve, in particular together with an in particular sleeve-shaped base body, in which the embossing sleeve is arranged, therefore forms a type of stamping die.

The hole punching operation and the hole forming operation are preferably carried out simultaneously and therefore together. This manifests itself in the fact that, at a certain point in time, a front (upper) end face of the embossing sleeve is positioned axially (against the feed direction) above an underside of the workpiece. At the same time, a front (lower) end face of the punch is arranged below (viewed in the feed direction) the deep-drawn collar/edge of the hole and inside the embossing sleeve.

At the same time, it is understood in the present case in particular that the embossing sleeve forms an abutment for the stamping process, that is to say is designed as a stamping die, into which the punch extends at least to a certain extent.

The feed movements of the punch and the embossing sleeve are preferably coordinated with one another in such a way that the collar is at least partially deep-drawn by means of the embossing sleeve and the punching operation with the punch only begins subsequently. In particular, the deep-drawing process is not yet complete when the punching process begins. Alternatively, the embossing sleeve first moves to a front end position before the punching process begins, that is to say before the punch penetrates the workpiece and punches out the hole. This process with the at least partial deep drawing of the collar ensures an accurate, dimensionally accurate hole formation. Alternatively, there is also the possibility of first performing the stamping process and then the deep-drawing process.

Furthermore, the punch sleeve, within which the (stamping) punch is guided, simultaneously forms an abutment for the hole-forming operation, that is to say for the embossing sleeve. The embossing sleeve therefore reshapes the edge of the hole against the punch sleeve, that is to say presses it against the punch sleeve. The collar, which is deep-drawn through the embossing sleeve, is thus pressed with its annular end face against the punch sleeve. This smoothes or planes the end face. That is to say the annular end face is designed as a flat, horizontally running surface. For this purpose, the punch sleeve is delivered to a predetermined axial position.

In an expedient embodiment, a centering pin can be moved within the embossing sleeve, which can preferably be moved into or through the hole after the punching operation has been carried out. In particular, the centering pin is moved in a controlled manner, for example with the aid of a corresponding (third) drive, especially a pneumatic drive. Alternatively, however, the centering pin can also be actuated passively, for example with the aid of a spring element.

The component carrier therefore has a plurality of components arranged concentrically to one another, namely a base body, the embossing sleeve guided therein and the centering pin guided therein.

The embossing sleeve itself is expediently moved in a controlled manner using a mechanical linkage, in particular using a knee lever mechanism. The embossing sleeve is preferably moved into a front position for performing the hole forming operation with the aid of the mechanical linkage. This is done specifically with the aid of a (second) drive, which is preferably an electromotive drive. The knee lever mechanism in particular is brought into a stretched state. The knee lever mechanism therefore exerts the force required to form the spout when it is adjusted. As an alternative to this, there is also the possibility, first of all, of moving the embossing sleeve into a front position and exerting the required force from above via the setting unit, that is to say when the component is placed on the embossing sleeve which is at this time extended.

The embossing sleeve can be moved back into a retracted position before the connecting element is pressed in. In the retracted position, the embossing sleeve preferably forms a counter stop or abutment for the press-in operation. In the retracted position, the embossing sleeve is therefore positioned at a suitable axial position, so that it can absorb the forces acting during the press-in process. For this purpose, a front end face of the embossing sleeve is preferably at least approximately aligned with the component support, that is to say is arranged at the axial height of the component support. In particular, this also means that the front end face deviates slightly, for example by half a component thickness of the workpiece, from an exactly aligned alignment.

For a reliable absorption of the forces, the embossing sleeve is preferably moved against a second mechanical fixed stop in the retracted position.

The punching slug obtained during the punching operation is disposed of via a discharge device formed within the base body. For this purpose, a laterally arranged, pivotable flap is formed, which, if necessary, forms a ramp for disposal of the punching slug to the side. The pivotable flap is preferably actuated automatically, in particular displaced by means of the centering pin when the latter is moved forward.

Since during the hole forming operation forces are exerted against the feed direction, these must be reliably absorbed by the setting unit and the hold-down device. The hold-down device is preferably resiliently mounted against a spring element, especially a spring element, within the feed unit. In order to prevent evasion during the hole forming operation, a first mechanical fixed stop is formed on the holding-down device, which abuts against a mechanical stop surface of the feed unit during the hole punching and hole forming operation, so that the forces are absorbed.

The overall structure of the device is further characterized in that the feed unit has a plunger, a spring element and a plunger tube which receives the plunger and the spring element. The setting unit is attached to the plunger tube and the plunger acts on the punch and moves it in and against the feed direction. The spring element also acts on the hold-down device. Finally, the punch is designed as a tubular sleeve, in which an ejector pin is guided so as to be displaceable relative to the sleeve.

During the multi-stage punching and setting operation in particular the following process steps take place:

First, the device is brought into a starting position in a first step. In particular, the unprepared component is placed in the tool carrier on the component carrier. The embossing sleeve and thus also the knee lever are in a back position.

In a next step, the hole punching and hole forming operation takes place, in which the hold-down device in particular first moves onto the component, specifically until the fixed stop of the hold-down device touches the stop surface and the further retraction of the hold-down device is blocked. In this state, the workpiece is then positioned and clamped between the upper edge of the component support and the lower edge of the hold-down device. The embossing sleeve is moved upwards via the mechanics, especially the knee lever drive, and thus deforms the component. The punching slug is punched and removed at the same time.

During this operation, it is advantageous if the (stamping) punch is displaceable relative to a punch sleeve (with the aid of which the press-in element is then later pressed in). There must therefore be an axial freedom of movement of the punch sleeve with respect to the stamping plunger. This axial release is controlled by a slide, as will be explained later. This control of the axial freedom of movement is an inventive, independent aspect of the present application.

In the third step, the component is finally fixed. For this purpose, the plunger tube is first pulled back into an intermediate position. The hold-down device still clamps the component during this retraction. The knee lever is moved back up to a fixed stop, so that the embossing sleeve is also returned. At the same time, a centering pin is extended and passed through the punched hole. This is done especially pneumatically. The component is fixed by the centering pin and can no longer move sideways.

In the fourth step, the press-in element, in particular press-in bolt, is fed. In this case, the plunger tube in particular is retracted further into an initial position and the hold-down device is lifted off the component surface. This is followed by the in particular lateral feeding of the press-in element into the setting unit.

Finally, the pressing takes place in the fifth step. Here, the plunger tube is moved forward again in the feed direction up to a press-in position. At the same time, the return stroke of the centering pin is preferably carried out. When moving up to the press-in position, the punch sleeve and the punch are axially locked, that is to say. they both proceed together. So they are pressed together against a head of the press-in bolt and press it into the pre-punched hole.

As already mentioned above, it is advantageous for the punching operation that the punch moves further forward compared to the punch sleeve, whereas at the same time during the pressing process both are moved together. For this purpose, it is generally provided that the two elements, the punch and the punch sleeve, are positively guided up to a predetermined position and that the forced guidance is defined or controlled released, so that the punch can be guided into an upstream front position. For the axial release or axial blocking between the punch and the punch sleeve, a twisting operation between the punch sleeve and the punch is expediently provided. In this case, the rotation is preferably carried out with the aid of a slide element which can be controlled in particular and which rotates one of the two components against the other. The rotating is expediently carried out with the aid of a driver element, in particular driver pin, which engages in the punch sleeve or in the punch and is arranged on the slide element. In principle, it is also possible for the driver pin to be arranged on the punch sleeve or the punch and that a corresponding recess is formed on the slide element, in which the driver pin then engages.

The slide element and the plunger sleeve move axially in the different steps relative to one another. As a result, the driver pin moves in and out of the associated recess in the axial direction/feed direction. In the delivered position, in particular during the punching operation and the press-in operation, the driver pin must be in engagement with the associated recess in order to enable the punch sleeve to be rotated relative to the punch in order to cause the axial release or the axial blocking. In order now to ensure that the driver pin is reliably inserted into the associated recess, the punch sleeve is rotatably guided at least over a defined axial stroke.

For this purpose, in particular a groove-pin guide is provided, in particular a pin protruding outward in the radial direction is attached to the punch sleeve and engages in a corresponding groove. This rotationally fixed guide is released from a defined axial position, so that the rotation of the punch sleeve relative to the punch can be controlled by means of the slide element.

Essential aspects of the device and the method for setting the connecting element, in particular press-in bolts are inter alia: placing press-in bolts without component preparation with two drives, i.e. the workpiece is not perforated/not spouted (collar is not formed); electrical drive units are preferably used to control the process, data from motor control are preferably used for process monitoring; setting the connecting elements without changing tools and in one axis; a slider for controlling the forced guidance of the two-part press-in/stamping punch, i.e. the punch and the punch sleeve; embossing (spouting, shaping the collar) optionally via a) knee lever drive (drive with sufficient feed force, counter-hold via drive unit of the plunger tube or b) move the knee lever to the extended position and apply stamping force via the drive unit of plunger tube (hold-down device moves to fixed stop)—fixed stop for embossing sleeve, so that the force is introduced into the tool carrier.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
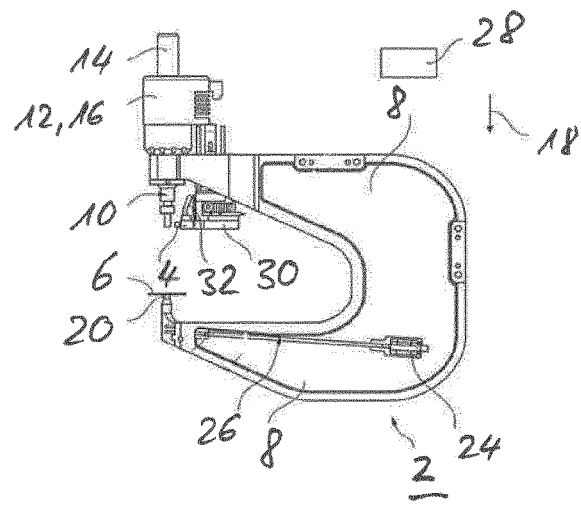
FIG. 1 shows a device for carrying out a setting process of a connecting element on a workpiece, FIGS. 2A-2E each show a cross-sectional view of a setting unit fastened to a feed unit for different method steps, with FIG. 2A showing the position in a starting position, FIG. 2B showing a position during the hole punching and hole-forming operation, and FIG. 2C the situation during the step of fixing of the component, FIG. 2D the situation when the press-in bolt is fed to the setting unit, and FIG. 2E the situation during the final press-in process.

FIG. 1 shows a device 2 which is designed to carry out a setting process and to set a connecting element 4, in particular a press-in bolt, in a component or workpiece 6. The workpiece 6 is, for example, a sheet metal or sheet metal component, for example a motor vehicle component. The connecting element 4 is in particular a so-called press-in bolt, which is typically connected to the workpiece 6 in a form-fitting and a force-fitting manner. Such a press-in bolt is basically characterized by a head and a shaft adjoining it, for example a threaded shaft.

The device 2 has a tool carrier 8, which in the exemplary embodiment is designed in the manner of a C-arm. A setting unit 10 is arranged on an upper arch arm, which in turn is connected to a feed unit 12. This has a plunger 14 and a drive 16, in particular an electric motor, which drives the plunger in a feed direction 18.

Opposite to the setting unit 10 is a component carrier 20 arranged at the lower bow arm of the tool holder 8. As will be described in more detail below, an embossing sleeve 22 which is displaceable in and against the feed direction is arranged within the component carrier 20 and is driven by a drive mechanism. In the exemplary embodiment, a second drive 24, in particular an electric motor, is provided for this purpose, which is connected to the embossing sleeve 22 via a mechanical linkage 26 for actuating it.

In operation, the tool carrier 8 is preferably attached to a manipulator, for example to a robot hand of a multi-axis robot, and is brought to the respective positions on the workpiece 6 at which connecting elements 4 are to be placed. To control the device 2, in particular to control the setting process described in more detail below, the device 2 also has a control device 28.

The device 2 according to FIG. 1 also has a supply unit 30, via which the individual connecting elements 4 can be automatically fed individually to the setting unit 10. The feed takes place laterally, that is perpendicular to the feed direction 18. The entire supply unit 30 can be moved in the feed direction 18, so that the connection elements 4 can be transferred at different axial positions. The individual connecting elements 4 are fed to the supply unit 30, for example via a hose 32.

The structure of the setting unit 10, the feed unit 12 and the tool carrier 20 and the method for carrying out the setting process are explained below in connection with FIGS. 2A to 2E and 3A to 3E. FIGS. 2A to 2E show different process stages when carrying out a setting process during a work cycle for setting a connecting element. FIGS. 2A to 2E provide a rough overview of the individual movements of the setting unit 10 and of the feed unit 12 in the individual process stages. FIGS. 3A to 3E each show enlarged representations in the area of the setting unit 10 and the component carrier 20. FIGS. 3A to 3E therefore correspond to the same situations and positions as in FIGS. 2A to 2E.

In FIGS. 2A to 2E, it can first be seen that the setting unit 10 is fastened to the feed unit 12 via a mechanically fixed connection, in particular a screw connection. The feed unit 12 has a plunger tube 34 in which the plunger 14 is arranged. The plunger 14 and the plunger tube 34 form a solid, common unit, i.e. they cannot be moved relative to one another. Feed movements in and against the feed direction 18 therefore take place together. The plunger 14 is in turn surrounded by a spring element 36, in particular a helical spring (compression spring). The feed unit 12 can be connected to the first drive 16. For this purpose, the plunger 14 with the thread shown is connected to a corresponding drive rod of the first drive 16 and forms a drive plunger with it.

The component carrier 20 is generally tubular or sleeve-shaped and has a component support 38 which is formed by a front end face. During operation, the workpiece 6 rests on this. The component carrier 20 is fastened to the lower arm of the tool carrier 8 and is arranged in particular in a channel 40 which extends in the feed direction 18. A centering pin 42 is arranged within this channel and can be moved in and against the feed direction 18 with the aid of a third drive 44. This third drive 44 can be a controlled active drive or also a passive drive which, for example, only exerts a spring force on the centering pin 42. It is preferably a controlled drive 44, specifically a compressed air drive. It can also be seen that the end of the mechanical linkage 26 is guided into the channel 40 via a joint mechanism. This is in particular a knee lever mechanism 46.

2A shows a starting position in which the device 2 is moved relative to the workpiece 6 (that is, either the device 2 is moved to a desired position on the workpiece 6 or the workpiece 6 is brought to the device 2). The feed unit 12 is in a retracted starting position.

Figures 2A, 2B, 2C, 2D, 2E:
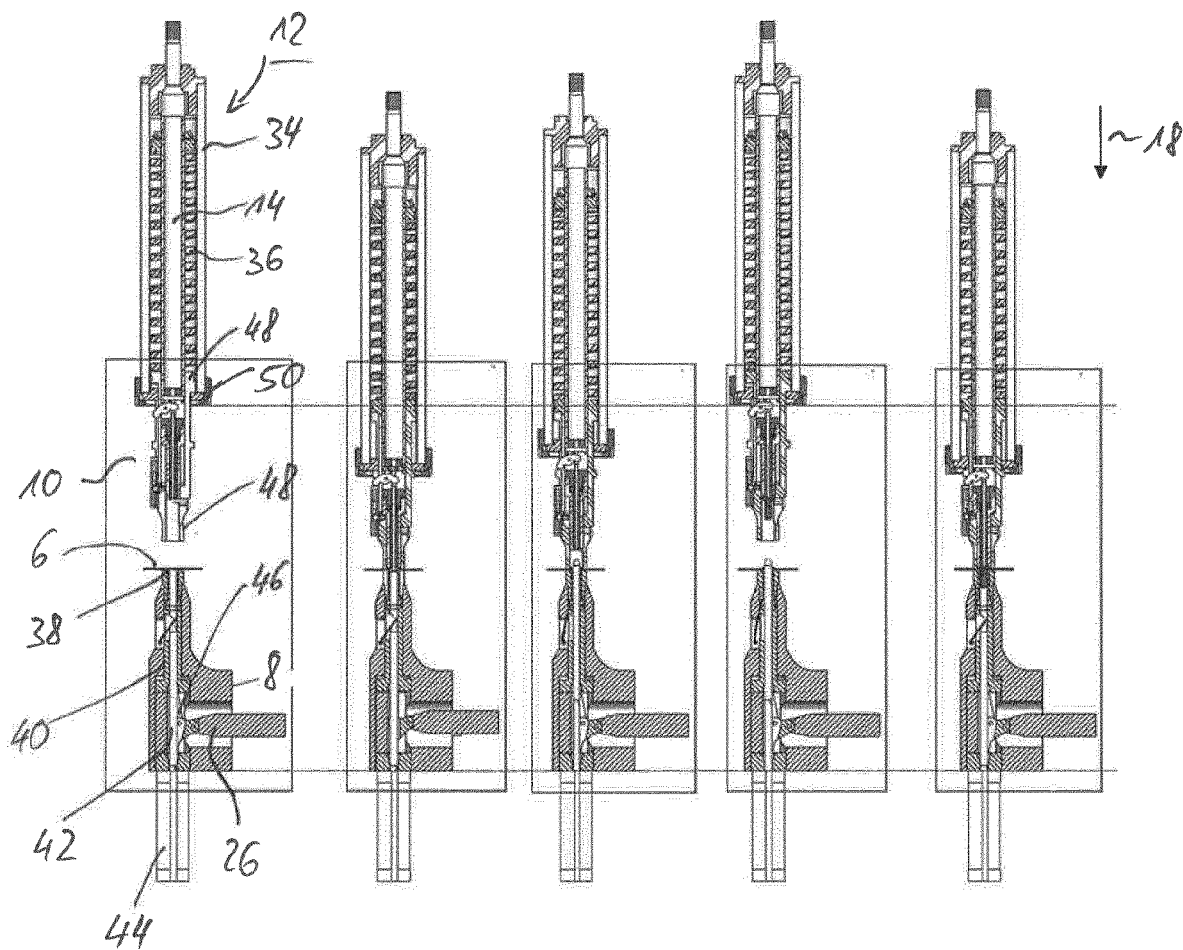

FIG. 2B shows the situation during a first processing stage, in which a hole punching and a hole forming operation are carried out. For this purpose, the entire feed unit 12 is moved in a forward press-in position in the feed direction 18. For this purpose, the plunger 14 is moved in the feed direction 18 by means of the first drive 16, so that the entire feed unit 12 and with it the setting unit 10 are moved. The workpiece 6 is clamped between the component carrier 20 and the setting unit 10 and is thus held in place. For this purpose, the setting unit 10 has a hold-down device 48 which is supported on the spring element 36 within the plunger tube 34. It is therefore pressed against the workpiece 6 with the spring force of the spring element 36. The spring element 36 is also somewhat compressed relative to the starting position.

In the next step, the workpiece 6 is fixed by inserting the centering pin 42 into the workpiece 6 from below. The feed unit 12 moves against the feed direction 18 into an intermediate position in which the hold-down device 48 presses the workpiece 6 against the component support 38 at least with a residual force.

In the next step, the connecting element 4 is fed from the side into an inner channel of the setting unit 10. For this purpose, the feed unit 12 moves back into the rear starting position. The workpiece 6 is fixed with respect to its lateral position via the centering pin 22.

In the next step shown in FIG. 2E the actual setting process takes place, in which the connecting element 4 is pressed into the workpiece 6. The feed unit 12 then moves back into the starting position shown in FIG. 2A and the working cycle shown in FIGS. 2A to 2E starts again for the next connecting element 4.

Of particular importance in the method described here is the integration of both the hole punching and the hole-forming operation as well as the press-in process in a work cycle, whereby work is always carried out in the same axial orientation during the entire work cycle, i.e. both the hole punching and hole-forming operation as well as the pressing in of the connecting element 4 is done within the same axial axis and without relative displacement between the device 2 and the workpiece 6. Furthermore, the device and the method are characterized by the simultaneous performance of the hole punching and hole-forming operation, as will be explained in more detail below.

Details of the structure of the setting unit 10 and of the component carrier 20 and the individual steps are explained below in connection with FIGS. 3A to 3E:

The setting unit 10 is screwed onto the plunger tube 34 by means of a union nut 50. The setting unit 10 has a plurality of parts arranged in the form of a sleeve concentrically one inside the other. On the one hand, this is the hold-down device 48 which, as already mentioned, extends into the plunger tube 34 and is supported there on the spring element 36. A punch sleeve 52 is further arranged within the hold-down device 48 and is guided in the hold-down device 48 so as to be slidable with a sleeve head 54, which is cup-shaped in the exemplary embodiment when viewed in cross section. In turn, a (stamping) punch 56 is guided within the punch sleeve 52, which is also sleeve-shaped. The punch 56 has a punch head 58 at its upper end. Viewed in cross section in its lower region, this is T-shaped in the exemplary embodiment and extends into the sleeve head 54 and is guided by the latter. An upper area of the punch head 58 is guided on the inner wall of the hold-down device 48.

In the further course, the punch 56 is guided inside the punch sleeve 52. In the head region, the punch head 58 also has a recess through which a control element, in particular a rocker arm 60, engages on the side. This serves to actuate an ejector pin 62 which is guided in the interior of the punch 56. The rocker arm 60 is actuated by means of an external drive unit 64. The rocker arm 60 can be pivoted or tilted about a rocking axis 66 and, correspondingly on both sides of the rocking axis 66, has two lever arms which are connected on the one hand to the ejector pin 62 and on the other hand to the drive unit 64.

The hold-down 48 has a first fixed stop 68 on its outer circumference, which is formed by one or more radially projecting webs. A stop surface 70 is assigned to this on the feed unit 12. This is essentially an end face of the feed unit 12, specifically the area of an annular flange which closes the plunger tube 34 on the end face and is held by means of the union nut 50. The hold-down device 48 is guided through this annular flange.

The hold-down device 48 itself receives the plunger 14 in its interior, which cooperates with the punch 56, specifically with the punch head 58, and exerts an axial force on the latter during operation during the setting process.

A lower part of the tool carrier 8 can be seen in the lower half of FIGS. 3A to 3E. In this, the already mentioned channel 40 is formed which extends in the axial direction. In the exemplary embodiment, this channel 40 is of step-shaped. The component carrier 20 is inserted in the upper end of the channel 40. The component carrier 20 comprise a sleeve-shaped base body 72, within which the embossing sleeve 22 is displaceable arranged. The end face of the base body 72 defines a component support 76. The free interior of the embossing sleeve 22 defines an inner channel 74 and serves to remove a punching slug 78 (compare FIGS. 3B, 3C). For its disposal and removal, a flap 80 is arranged, which can be pivoted into and out of the inner channel 74 and is connected to a lateral opening 82. If the flap 80 is as shown in FIG. 3 folded inwards, it lies against the inner wall of the inner channel 74 and forms a ramp for the punching slug 78, which is disposed of via this ramp to the outside.

A guide sleeve 84 adjoins the sleeve-shaped base body 72, in which the inner channel 74 is continued. The embossing sleeve 22 is supported on the guide sleeve. When the guide sleeve 84 is displaced, the movement is therefore transmitted to the embossing sleeve 22. In principle, there is also the possibility that the guide sleeve 84 and the embossing sleeve 22 are formed in one piece. The guide sleeve 84 is slidably disposed within the channel 40. The inner channel 74 of the embossing sleeve 22 is continued in the guide sleeve 84. The guide sleeve 84 in turn also has a lateral opening which is open to the lateral opening 82 of the tool carrier 8.

The guide sleeve 84 is complementary to the channel 40 and has a T-shaped foot region. At the bottom, the guide sleeve 84 is adjoined by an abutment which is fixedly connected to the tool carrier 8 and which defines a second fixed stop 94.

The centering pin 42 is guided within the guide sleeve 84. The centering pin 42 automatically acts on the flap 80 when it is moved to a front position.

Figure 3A:
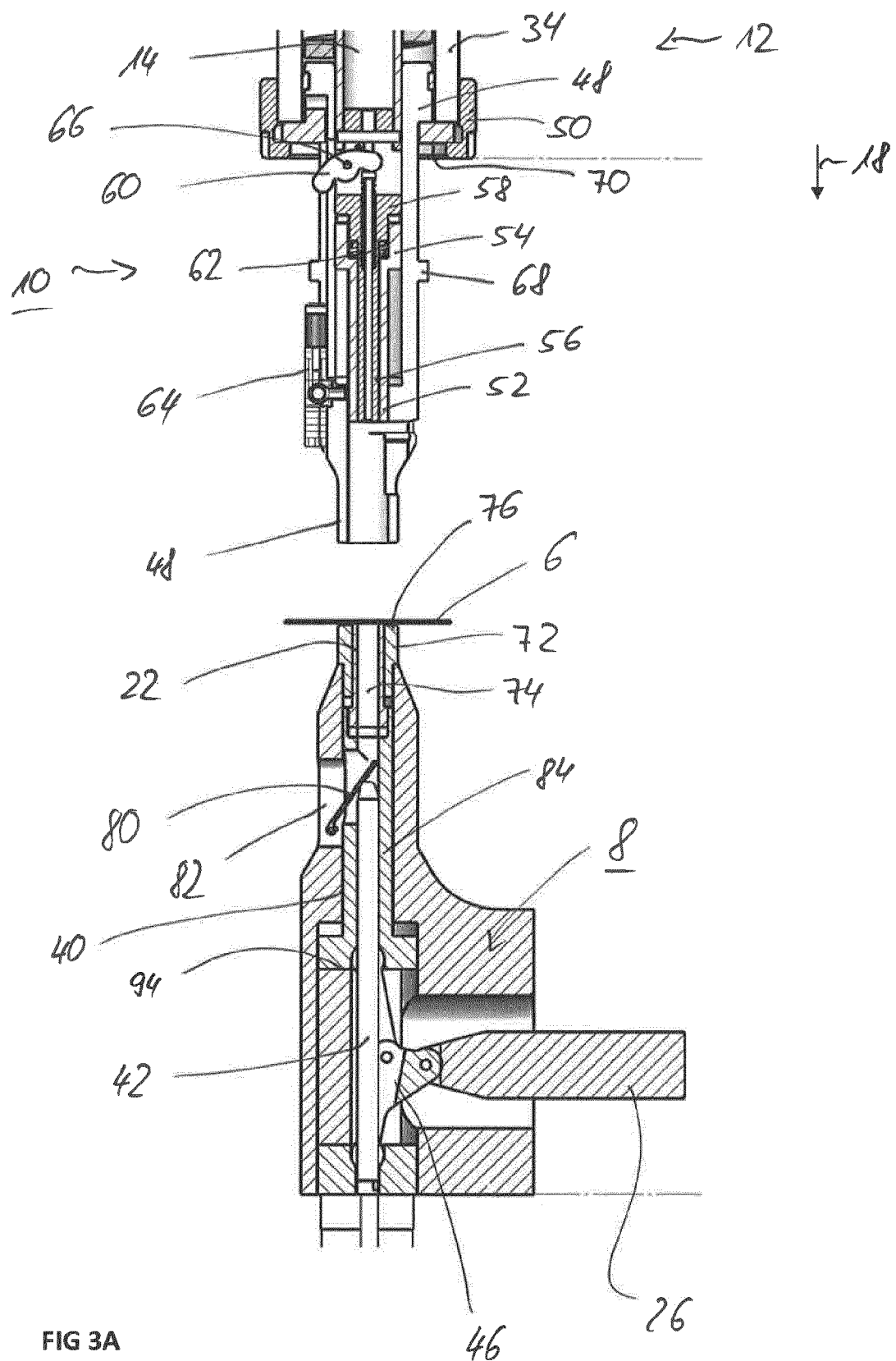
FIGS. 3A-3E are enlarged, partial representations of FIGS. 2A to 2E
Figures 3B, 3C:
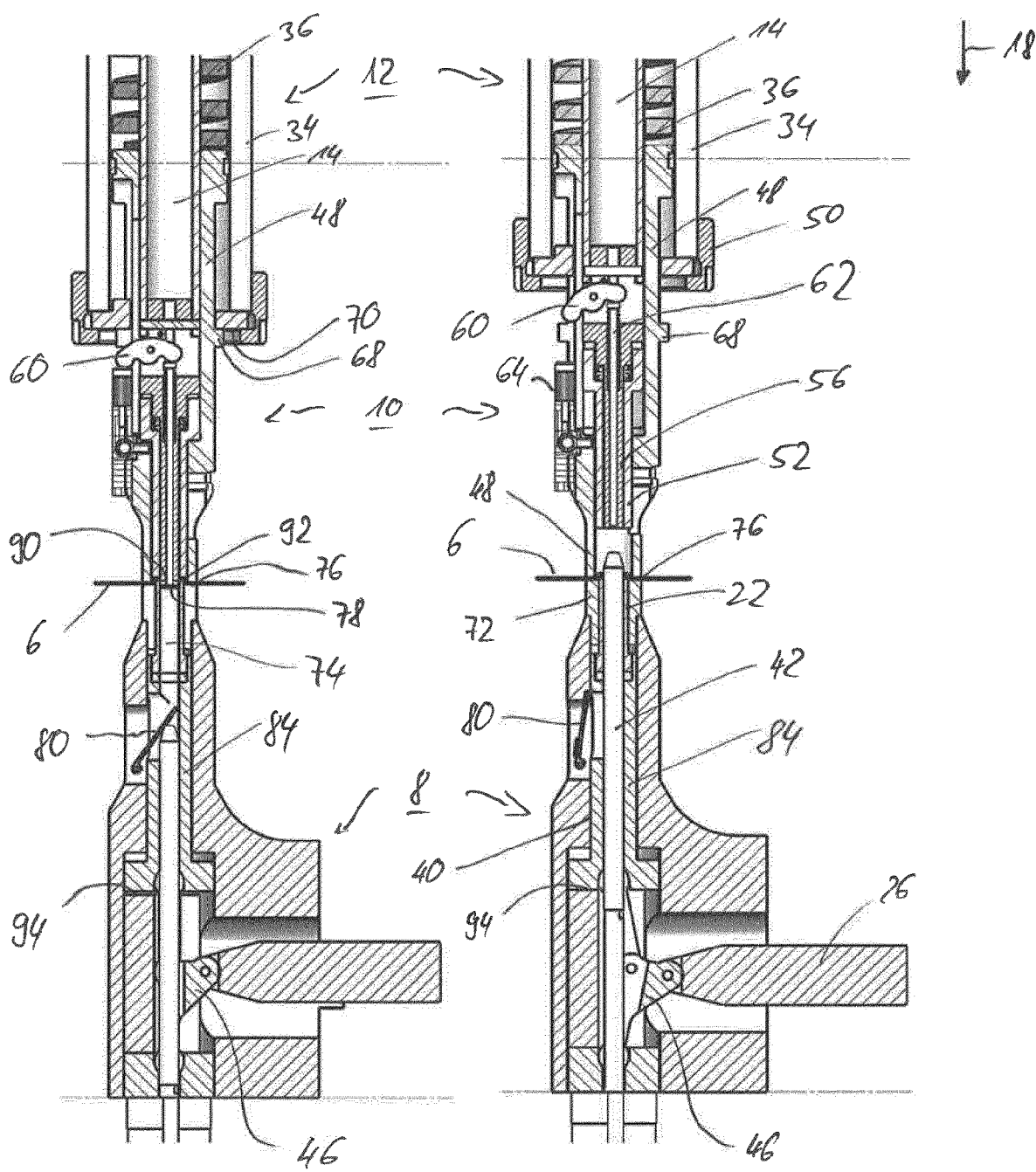

For actuation and displacement of the embossing sleeve 22, the mechanical linkage 26 with the knee lever mechanism 46 arranged at the end is provided. An actuating rod is connected at the end via a toggle joint to two lever arms of the knee lever mechanism 46. In FIG. 3A is the embossing sleeve 22 in a retracted position. In this retracted position the knee lever mechanism 46 is angled. In the front position of the embossing sleeve 22, which is shown in FIG. 3B is shown, the knee lever mechanism 46 is stretched. In this extended position, high forces can be absorbed without being transmitted to the mechanical linkage 26 and via this to the second drive 24.

The working cycle for setting the connecting element 4 is as follows:

Based on the in FIG. 3A shown starting position takes place in a first stage according to FIG. 3B the hole punching and hole forming operation. For this purpose, the plunger 14 is pressed down in the feed direction 18 with the aid of the first drive 16. As a result, the entire feed unit 12 moves down into the front press-in position. As soon as the holding-down device 48 comes to rest on the surface of the tool 6 and the feed movement is continued, there is a relative displacement between the holding-down device 48 and the punch sleeve 52. Together with the punch 56 (and the ejector pin 62), this is guided forward during the further feed movement. When the stamping sleeve 52 reaches the surface of the workpiece 6 with its front end face, the positive coupling between the stamping sleeve 52 and the punch 56 is released and there is only a remaining stroke for the punch 56, so that the workpiece 6 is punched through and a hole 90 is produced. The punching slug 78 already mentioned is disposed of as described above.

Parallel to this feed movement of the plunger 14 and the parallel to the punching process, the embossing sleeve 22 is brought into the front position with the aid of the knee lever mechanism 46. This preferably takes place only after the hold-down device 48 presses the workpiece 6 against the component support 76. Specifically, the hold-down 48 is in a stop position, in which the first fixed stop 68 bears against the stop surface 70, as shown in FIG. 3B can be seen. By actuating the embossing sleeve 22, the workpiece 6 is deformed in the manner of a deep-drawing process. In this case, a deep-drawn collar 92 is formed—contrary to the feed direction 18—which runs all the way to the punched-out hole 90. This deep-drawn collar 92 is also referred to as a spout. This forming process in the manner of deep drawing is referred to here as the hole forming process. This hole forming process takes place essentially parallel and at the same time as the hole punching process, i.e. the control is designed in such a way that the movement of the embossing sleeve 22 and that of the punch 56 (movement decoupled from the punch sleeve 52) take place simultaneously and in opposite directions.

The embossing sleeve 22 generally also forms a die for the punching process. For this purpose, it has a sharp-edged front inner edge. The punch 56 moves precisely into the embossing sleeve 22 during the stamping process.

To eject the punching slug 78, the rocker arm 60 is further actuated via the drive unit 64, so that the ejector pin 62 is pressed down and the punching slug 78 is disposed of via the flap 80 and the lateral opening 82.

After this first stage (hole punching and hole forming process), the workpiece 6 is first fixed laterally, in that the centering pin 42 moves into the workpiece 6 from below and preferably also passes through it. For this purpose, the centering pin 42 has a conical front end. The outside diameter of the centering pin 42 corresponds to the inside diameter of the hole 90, with the exception of the required tolerances, so that reliable lateral guidance and fixing is ensured. The centering pin 42 is adjusted by means of the third drive 44, for example pneumatically controlled.

The centering pin 42 is introduced while the holding-down device 48 still presses the workpiece 6 against the component support 76. At the same time, the feed unit 12 is moved by moving the plunger 14 back into the intermediate position, so that in particular the plunger sleeve and the plunger 56 have also been withdrawn, so that the centering pin 42 can penetrate into the vacated interior in the hold-down device 48.

Like the punch sleeve 52, the embossing sleeve 22 is also returned to the retracted starting position.

Figures 3D, 3E:
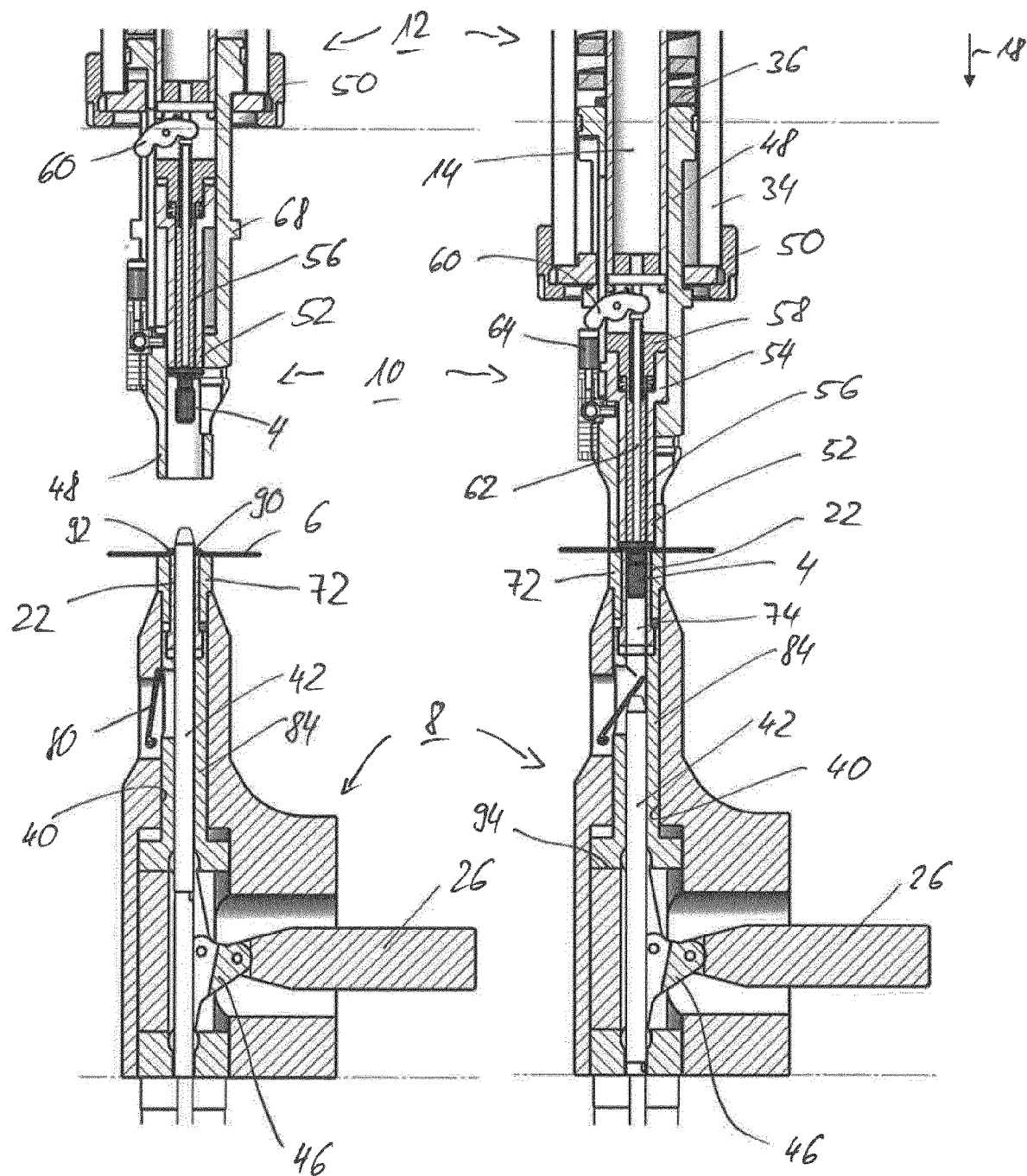

In the next step, which is shown in FIG. 3D, the feed unit 12 is retracted further, in particular to the starting position. In this starting position the connecting element 4, that is, the press-in bolt, is introduced into a setting channel of the setting unit 10 via a lateral opening in the hold-down device 48. In the starting position, a lower section of the hold-down 48 is released, that is, the punch sleeve 52 is returned far enough.

To carry out the press-in process, which is shown in FIG. 3E, the plunger 14 and thus the feed unit 12 again move in the feed direction 18. The punch sleeve 52 with the punch 56 now serves as a press-in punch for the connecting element 4. The end face of the punch sleeve 52 and of the punch 56 are preferably aligned with one another, that is to say they form a common punch surface, which act on a head of the connecting element 4. By exerting a press-in force via the plunger 14, which is transmitted to the connecting element 4 via the plunger sleeve 52, the latter is pressed into the pre-punched workpiece 6. The head of the connecting element 4 comes to rest on a hole edge of the hole 90. The head is pressed against the deep-drawn or raised collar 92. A special sub-head geometry is usually formed on the underside of the head. By pressing the collar 92 with the head, the material is deformed, so that a positive and a non-positive connection takes place between the connecting element 4, which is designed as a press-in element, and the material of the collar 92.

In particular, a form-locking material entanglement ensures both an axial pull-out lock and an anti-rotation lock.

This press-in process in turn results in high forces which have to be absorbed by the component carrier 20. It is also of particular importance that the end edge of the embossing sleeve 22 forms a counter bearing for the forming process during the pressing. In order to reliably absorb the existing forces, the embossing sleeve 22 is supported in its retracted position on the second mechanical fixed stop 94. As can be seen from FIGS. 3A, 3C, 3D and 3E, which all show situations in which the embossing sleeve 22 is in its withdrawn situation, this second mechanical fixed stop 94 is formed by a component (sleeve) within the tool carrier 8. This component is arranged in a stationary manner within the tool carrier 8. The embossing sleeve 22 is supported indirectly on the second fixed stop 94 via the guide sleeve 84.

Figures 4A, 4B, 4C:
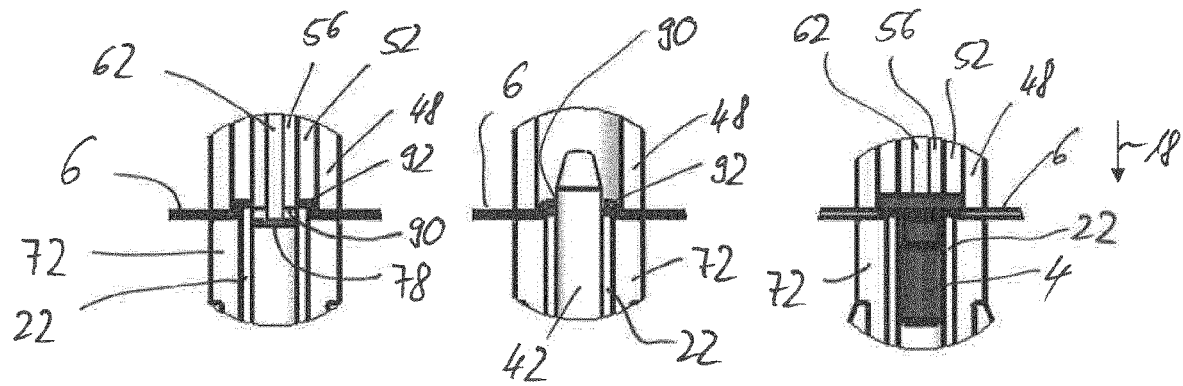
FIG. 4A is an enlarged view of the area marked with a circle P in FIG. 3B during the hole-punching and hole-forming operation.
FIG. 4B is an enlarged view of the same area as it is marked with the circle Q in FIG. 3C in the step of fixing the workpiece.
FIG. 4C is an enlarged view of the same area, as indicated by the circle R in FIG. 3E, in the pressing step.

In the retracted position, the front annular face of embossing sleeve 22 generally acts as an abutment. The end face of the embossing sleeve 22 is in the retracted position at a comparable axial height as the component support 76. This is understood to mean that the end face of the embossing sleeve 22 is flush with the component support 76 or, alternatively, protrudes slightly over the component support 76, for example by half the component thickness of the workpiece 6. This can also be seen in particular in FIGS. 4A, 4*b* and 4*c*, which show enlarged representations of the area of the hole 90 during the hole forming/punching process (FIG. 4A), the fixing step (FIG. 4B) and the press-in step (FIG. 4C):

Based on FIG. 4A it can be seen that the embossing sleeve 22 is in its forward position and has formed the collar 92. At the same time, it can be seen that the holding-down device 48 presses the workpiece 6 against the component support 76 of the base body 72. Hold-down device 48 and base body 72 preferably have the same outside diameter and are aligned with one another on the outside. Furthermore, the lower end of the punch sleeve 52 can be seen, which preferably comes to rest on the upper side of the collar 92. The embossing sleeve 22 therefore presses the collar 92 against the lower end edge of the stamping sleeve 52 (not absolutely necessary). Furthermore, it can be seen that the axial stroke of the punch 56 is decoupled from the punch sleeve 52 for the punching process, so that the front end of the punch 56 protrudes further in the feed direction 18. It can also be seen that the ejector pin 62 acts on the punching slug 78 and already protrudes beyond the punch 56. In the FIG. 4 B, 4C, the retracted position of the embossing sleeve 22 can be seen, which protrudes slightly against the feed direction over the component support 76 and penetrates into the hole 90 approximately up to half the thickness of the workpiece 6 (in the case of several workpieces of the total thickness thereof). The centering pin 42 is passed through the hole 90.

From FIG. 4C it can also be seen that for pressing in the punch 56, the punch sleeve 52 and the ejector pin 62 (not absolutely necessary) form a common end face which acts on the head of the connecting element 4 and presses it into the pre-punched hole 90. When pressed in, the head rests on the edge of the hole and the raised collar 92 is deformed again.

As previously explained, the punch 56 and the punch sleeve 52 are positively guided depending on the stroke distance or a mechanical positively guided movement is released depending on the stroke path. This is necessary in order to enable a decoupled movement between the punch sleeve 52 and punch 56 for the punching process. It is therefore necessary that the mechanical positive coupling is released for the required punch stroke.

The mechanism provided for this purpose is explained in connection with FIGS. 5A. and 5B in more detail. An axial forced guidance is formed in that the punch 56 and the punch sleeve 52 have corresponding driving stops in a driver area, namely front driving stops 102 and rear driving stops 104. Front driver stops 102 are understood to mean the stop surfaces oriented in the direction of the other component.

The rear driver stops 104 are arranged offset in the axial direction. The driver stops 102, 104 are specifically formed by projections or recesses. In particular, a crenellated formation is provided. During the feed movement in the feed direction 18, the force is transmitted between the two components punch 56 and punch sleeve 52 via the driver stops 102. Here, the front driver stops 102 abut one another. In order to enable a decoupling movement for the punching process, a relative rotation is provided between the punch 56 and the punch sleeve 52, so that the front driver stops 102 are disengaged. The individual crenellated elevations can therefore engage in the corresponding bulges on the other component. The axial height of the bulges or crenellations defines a maximum stroke within which the movements of the punch 56 and the punch sleeve 52 are decoupled.

Figures 5A, 5B:
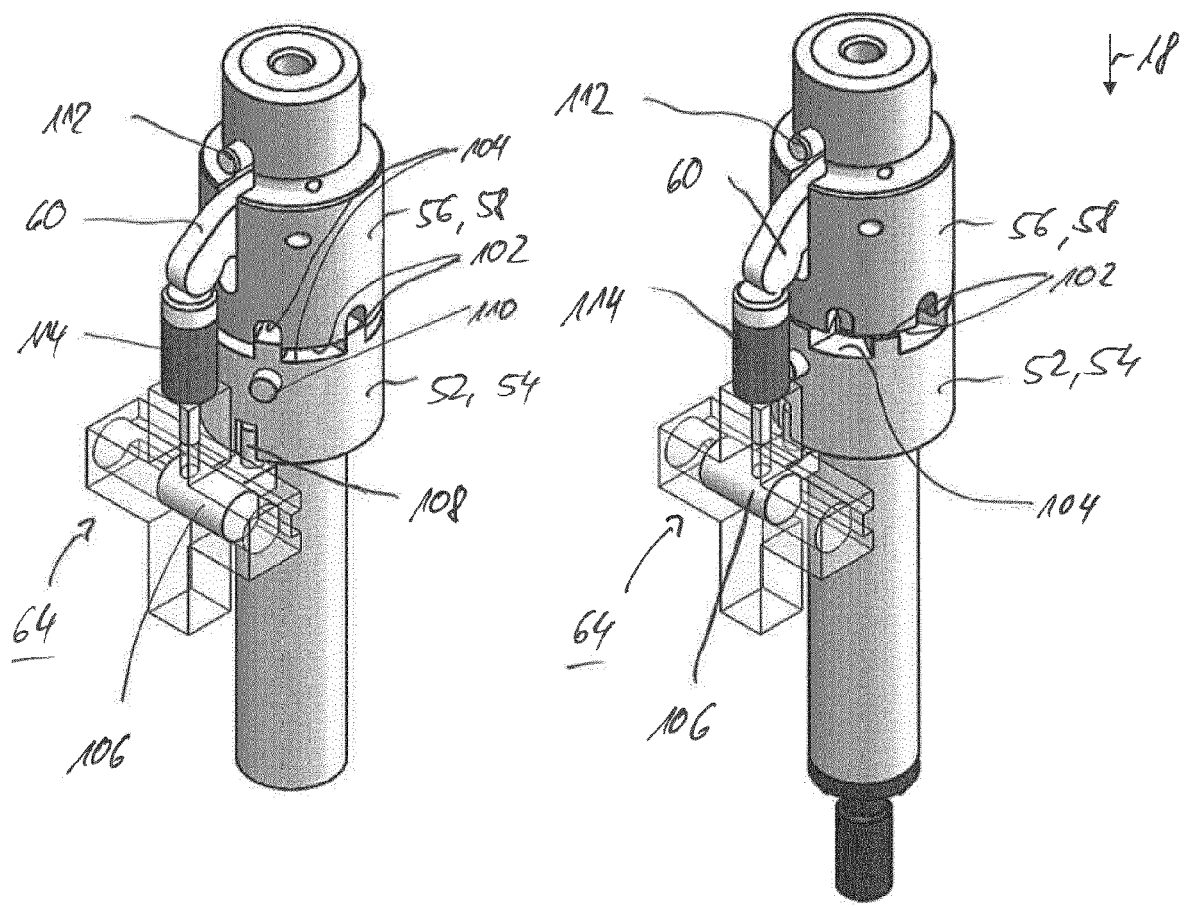
FIGS. 5A and 5B are detail three-dimensional representations of the setting unit to explain the axial release or the axial blocking of the punch sleeve relative to the punch.

The coupled situation, in which the front driver stops 102 lie on one another, is shown in FIG. 5B, the decoupled position after a rotation in FIG. 5A. It can be clearly seen that the crenellations of the punch sleeve 52, which protrude upward in the feed direction 18, engage in the corresponding receptacles on the punch 56. The driver stops 102, 104 are preferably each formed in the area of the sleeve head 54 and the punch head 58.

The rotation of these components relative to one another is carried out actively by means of the drive unit 64. This comprises a slide element 106 which can be moved back and forth between two end positions. Via a driver 108, which is designed in particular as a pin/driver pin, this sliding movement is transmitted to the punch sleeve 52 in order to carry out a rotary movement.

As can also be seen, the punch sleeve 52 has a guide element which is specially designed as a pin 110 and projects radially outward. This is positively guided within the holding-down device 48 in a corresponding guide groove up to a defined axial lifting position, so that rotation is only possible from a predetermined axial high position. This twist-proof guide also ensures that the driver 108 engages reliably in the associated recess of the punch sleeve 52. A further pin 112, which is arranged on the punch head 56 and protrudes radially, similarly ensures that the punch 56 is secured against rotation.

In addition to the slide element 106, the drive unit 64 additionally has a linear unit 114, in particular with a piston/cylinder unit, via which the rocker arm 60 can be actuated.

The aspect of the forced coupling and of the exercise of the rotational movement described with reference to FIGS. 5A, 5B with the aid of the slide element 106 is regarded as an independent inventive solution.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for carrying out a setting process for setting a connecting element on a workpiece, the device comprising:
    a setting unit that comprises:
    a punch that is moveable in a feed direction relative to a hold-down device for punching a hole in the workpiece; and
    a punch sleeve for pressing the connecting element into the hole,
    wherein the punch and the punch sleeve are connected to one another for a common feed movement in the feed direction, and wherein the connection between the punch and the punch sleeve is able to be released in a controlled manner, so that the punch is moveable relative to the punch sleeve for punching the hole in the workpiece and
    wherein the punch and the punch sleeve are connected to one another such that:
        the punch sleeve and the punch are adapted to be rotated relative to one another, so that in a predetermined rotational position, the connection between the punch and the punch sleeve is released and the punch is movable relative to the punch sleeve for performing the punching operation, or
        the punch sleeve and the punch are adapted to be rotated relative to one another by a drive unit that is controllable freely, a rotation taking place by a driver that engages in the punch sleeve or the punch, or
        the punch sleeve is guided in the feed direction within the hold-down device in a rotationally secure manner up to a predetermined axial position at which the connection between the punch and the punch sleeve is released by rotating the punch sleeve, or
        front and rear driver stops are formed on the punch sleeve and on the punch, wherein the front driver stops are disengaged for releasing the connection between the punch and the punch sleeve by rotating the punch sleeve.

2. The device according to claim 1, wherein:
    in an initial position, the workpiece rests on a component support;
    the setting unit moves in the feed direction and the hold-down device presses the workpiece against the component support and the hole punching and hole-forming operation is carried out;
    the position of the workpiece is fixed by moving in a centering pin;
    resetting the setting unit against the feed direction and feeding the connecting element into the setting unit;
    feeding the setting unit in the feed direction and pressing in the connecting element into the workpiece; and
    returning to a starting position.

3. The device according to claim 2, wherein the following steps are carried out during the hole punching and hole forming operation:
    the hold-down device moves towards the workpiece until a first fixed stop of the hold-down device comes to rest on a stop surface of a feed unit and the hold-down device is blocked from moving back against the feed direction;
    an embossing sleeve is moved upwards against the feed direction and forms a collar;
    the hole is punched and a punching slug is removed; and
    for punching the hole, the connection between the punch sleeve and the punch is released.

4. The device according to claim 3, wherein the following steps take place between the hole punching/hole forming operation and the setting process for fixing the workpiece:
    return stroke of a plunger tube of the feed unit into an intermediate position in which the workpiece is still clamped;
    return stroke of the embossing sleeve to a second fixed stop;
    moving the centering pin into the hole.

5. A device for carrying out a setting process for setting a connecting element, the device comprising:
    a setting unit that is attached to a tool carrier and that is movable in a feed direction via a feed unit;
    a component carrier fastened opposite the setting unit on the tool carrier and against which the setting unit is moveable in the feed direction,
    wherein the setting unit comprises:
        a hold-down device that presses a workpiece against the component carrier during operation;
        a punch that is moveable in the feed direction relative to the hold-down device for punching a hole in the workpiece; and
        a punch sleeve to press the connecting element into the hole;

wherein the component carrier comprises:
- a base body with a component support for the workpiece; and
- an embossing sleeve that is displaceably arranged in the base body and moveable against the workpiece during operation, such that in operation a deep-drawn collar is formed around the hole, the deep-drawn collar projecting from the workpiece in a direction towards the hold-down device,
- wherein in operation in a multi-stage setting process, in a first stage, a hole punching and hole forming operation to form the hole with the deep-drawn collar takes place and, in a second stage, a setting process for setting the connecting element takes place, and
- wherein no lateral relative movement between the workpiece and the device takes place between the two stages.

6. The device according to claim 5, wherein the embossing sleeve is moved back into a retracted position before the connecting element is pressed in, and wherein the embossing sleeve forms an abutment for the connecting element during the setting process.

7. The device according to claim 6, wherein the embossing sleeve is moveable into the retracted position against a second fixed stop.

8. The device according to claim 5, wherein the hole punching and the hole forming operation takes place simultaneously.

9. The device according to claim 5, wherein the punch sleeve forms an abutment for the embossing sleeve during the hole-forming operation.

10. The device according to claim 5, wherein a centering pin is moveable against the feed direction within the embossing sleeve, and wherein after the first stage, the centering pin is moved into the formed hole.

11. The device according to claim 5, wherein the embossing sleeve is moveable by a mechanical linkage, and wherein the mechanical linkage has a knee lever mechanism, and wherein the embossing sleeve is moved against the workpiece by actuating the knee lever mechanism to form the deep-drawn collar.

12. The device according to claim 5, wherein the hold-down device has a first fixed stop that bears against a stop surface of the feed unit during the punching and hole-forming operation.

13. The device according to claim 5, wherein the feed unit has a plunger, a spring element and a plunger tube that receives the plunger and the spring element, wherein the setting unit is fastened to the plunger tube, wherein the plunger moves against the punch, wherein the spring element acts on the hold-down device and the punch is further designed as a sleeve in which an ejector pin is guided so as to be displaceable relative to the punch sleeve.

14. A method for setting a connecting element on a workpiece using a device, which has a setting unit with a hold-down device and a component carrier opposite the setting unit with a component support, the method comprising:
- in a first stage:
  - performing a hole punching and hole forming operation in which the workpiece is clamped between the hold-down device and the component support;
  - punching a hole using a punch of the setting unit;
  - moving the punch relative to the hold-down device in a feed direction; and
  - forming a deep-drawn collar surrounding the hole using an embossing sleeve, which is arranged in the component carrier and is moved counter to the feed direction, the deep-drawn collar projecting from the workpiece in a direction towards the hold-down device; and
- in a second stage:
  - pressing the connecting element into the hole via the setting unit,
- wherein between the first stage and the second stage, no lateral relative movement between the workpiece and the device takes place.

\* \* \* \* \*